(12) United States Patent
Itou et al.

(10) Patent No.: US 11,260,731 B2
(45) Date of Patent: Mar. 1, 2022

(54) VEHICLE DOOR ASSEMBLY

(71) Applicants: Nissan North America, Inc., Franklin, TN (US); NISSAN MOTOR CO., LTD., Yokohama (JP)

(72) Inventors: Toshihiko Itou, Isehara (JP); Jose Adrian Delgado Hernandez, Toluca (MX); Ernesto Velazquez Alvarez, Calimaya (MX); Diego Armando Dominguez López, Toluca (MX)

(73) Assignees: NISSAN NORTH AMERICA, INC., Franklin, TN (US); NISSAN MOTOR CO., LTD., Kanagawa (JP)

( * ) Notice: Subject to any disclaimer, the term of this patent is extended or adjusted under 35 U.S.C. 154(b) by 127 days.

(21) Appl. No.: 16/779,151

(22) Filed: Jan. 31, 2020

(65) Prior Publication Data
US 2021/0237543 A1 Aug. 5, 2021

(51) Int. Cl.
*B60J 5/04* (2006.01)

(52) U.S. Cl.
CPC ........... *B60J 5/0451* (2013.01); *B60J 5/0415* (2013.01); *B60J 5/0418* (2013.01); *B60J 5/0452* (2013.01); *B60J 5/0413* (2013.01); *B60J 5/0416* (2013.01); *B60J 5/0434* (2013.01); *B60J 5/0455* (2013.01); *B60J 5/0458* (2013.01)

(58) Field of Classification Search
CPC ...... B60J 5/0458; B60J 5/0418; B60J 5/0451; B60J 5/0452
USPC ....................................................... 296/1.03
See application file for complete search history.

(56) References Cited

U.S. PATENT DOCUMENTS

| | | | |
|---|---|---|---|
| 7,568,744 B2 | 8/2009 | Tanorio et al. | |
| 2001/0017476 A1 | 8/2001 | Nishikawa et al. | |
| 2005/0189789 A1 * | 9/2005 | Schmidt ................. | B60J 5/0451 296/187.12 |
| 2007/0069532 A1 | 3/2007 | Tanorio et al. | |
| 2008/0246309 A1 | 10/2008 | Abe | |

(Continued)

FOREIGN PATENT DOCUMENTS

| | | | |
|---|---|---|---|
| DE | 102008011754 A1 | 9/2009 | |
| DE | 102016008585 A1 * | 2/2017 | ............ B60J 5/0451 |
| RU | 180276 U1 | 6/2018 | |

OTHER PUBLICATIONS

Photograph of vehicle Alliance Internal, Jan. 2019.

(Continued)

*Primary Examiner* — Jason S Morrow
(74) *Attorney, Agent, or Firm* — Global IP Counselors, LLP

(57) ABSTRACT

A vehicle door assembly includes an inner door panel that partially defines a cavity therein, a door handle assembly, a main reinforcing bracket, a first reinforcing bracket and a vibration absorbing member. The first reinforcing bracket has an upper end fixedly attached to the main reinforcing bracket and to a rearward area of the inner door panel within the cavity below the door handle assembly. The vibration absorbing member has an outboard surface, an inboard surface and a main projection that extends forward from the main body. The main projection is fixed to the first reinforcing bracket such that the main body is rearward of the first reinforcing bracket. The outboard surface is shaped and dimensioned to correspond to the overall shape of the inboard portion of the door handle assembly.

18 Claims, 15 Drawing Sheets

(56) References Cited

U.S. PATENT DOCUMENTS

| | | |
|---|---|---|
| 2010/0109379 A1 | 5/2010 | Abe |
| 2011/0169302 A1 | 7/2011 | Deng et al. |
| 2014/0049058 A1 | 2/2014 | Kudoh et al. |
| 2020/0238798 A1* | 7/2020 | Kovie .................. B60J 5/0452 |
| 2020/0248487 A1* | 8/2020 | Muta ...................... E05B 77/02 |
| 2020/0248488 A1* | 8/2020 | Muta ...................... B60J 5/043 |

OTHER PUBLICATIONS

U.S. Appl. No. 16/264,927; Vehicle Door Assembly; Y Muta et al., filed Feb. 1, 2019.
U.S. Appl. No. 16/264,952; Vehicle Door Assembly; Y Muta et al., filed Feb. 1, 2019.

* cited by examiner

VEHICLE DOOR ASSEMBLY

BACKGROUND

Field of the Invention

The present invention generally relates to a vehicle door assembly. More specifically, the present invention relates to vehicle door assembly that includes vibration absorbing member that is configured to absorb and distribute impact forces during a side impact event among various elements of the door assembly.

Background Information

Vehicles are continuously being tested in conditions where impact forces during a side impact event are directly applied to a vehicle door assembly.

SUMMARY

One object of the present disclosure is to provide features to a vehicle door assembly such that in response a side impact event where impact forces act on the vehicle door assembly, the impact forces are distributed to predetermined areas and elements of the vehicle door assembly.

In view of the state of the known technology, one aspect of the present disclosure is to provide a vehicle door assembly with an outer door panel, an inner door panel, a door handle assembly, a main reinforcing bracket, a first reinforcing bracket and a vibration absorbing member. The outer door panel has an inboard surface and an outboard surface. The inner door panel has an outer periphery fixed to a corresponding outer periphery of the outer door panel such that the outer and inner door panels define a cavity therebetween. The door handle assembly is fixedly attached the outer door panel with at least a portion of the door handle assembly overlaying the inboard surface of the outer door panel within the cavity. The main reinforcing bracket extends from a forward end of the inner door panel to a rearward end of the inner door panel along a lower end of a window opening. The first reinforcing bracket has an upper end fixedly attached to the main reinforcing bracket and to a rearward area of the inner door panel within the cavity below the door handle assembly. The vibration absorbing member has a main body with an outboard surface, an inboard surface and a main projection that extends forward from the main body. The main projection is fixed to the first reinforcing bracket such that the main body is rearward of the first reinforcing bracket and the outboard surface is shaped and dimensioned to correspond to the shape of the inboard portion of the door handle assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
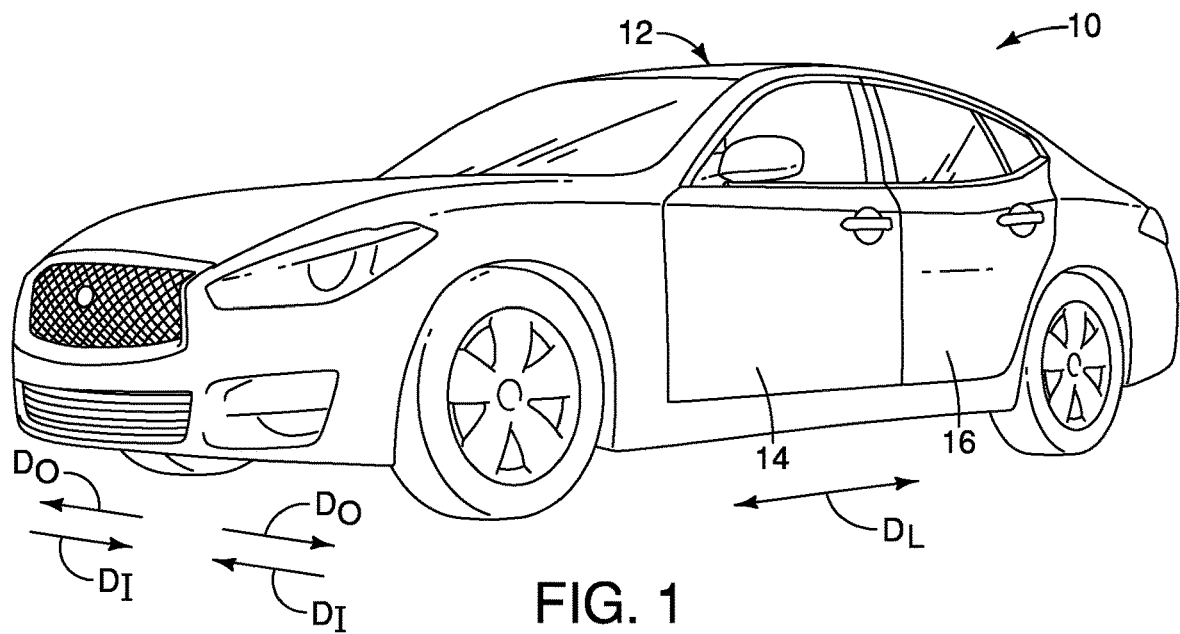
FIG. 1 is a perspective view of a vehicle that includes a vehicle door assembly (a rear door) in accordance with a first embodiment.

Referring initially to FIG. 1, a vehicle 10 is illustrated in accordance with a first embodiment. The vehicle 10 includes a vehicle body structure 12 with front doors 14 and rear doors 16 (a vehicle door assembly).

As shown in FIG. 1, a plurality of differing directions is defined relative to the vehicle 10. Those directions include: a vehicle longitudinal direction $D_L$; a vehicle inboard direction $D_I$; and a vehicle outboard direction $D_O$. The vehicle inboard direction $D_I$ and the vehicle outboard direction $D_O$ are defined relative to an imaginary center line of the vehicle 10, where the imaginary center line extends in the vehicle longitudinal direction $D_L$ of the vehicle 10. Reference to inboard and outboard directions in the following description are with respect to the above listed vehicle directions.

The vehicle 10 is depicted as a four door sedan. However, the vehicle 10 can be any of a variety of vehicle designs, such as a crew cab pickup truck, an SUV (sports utility vehicle) or other four door vehicle design.

Figure 2:
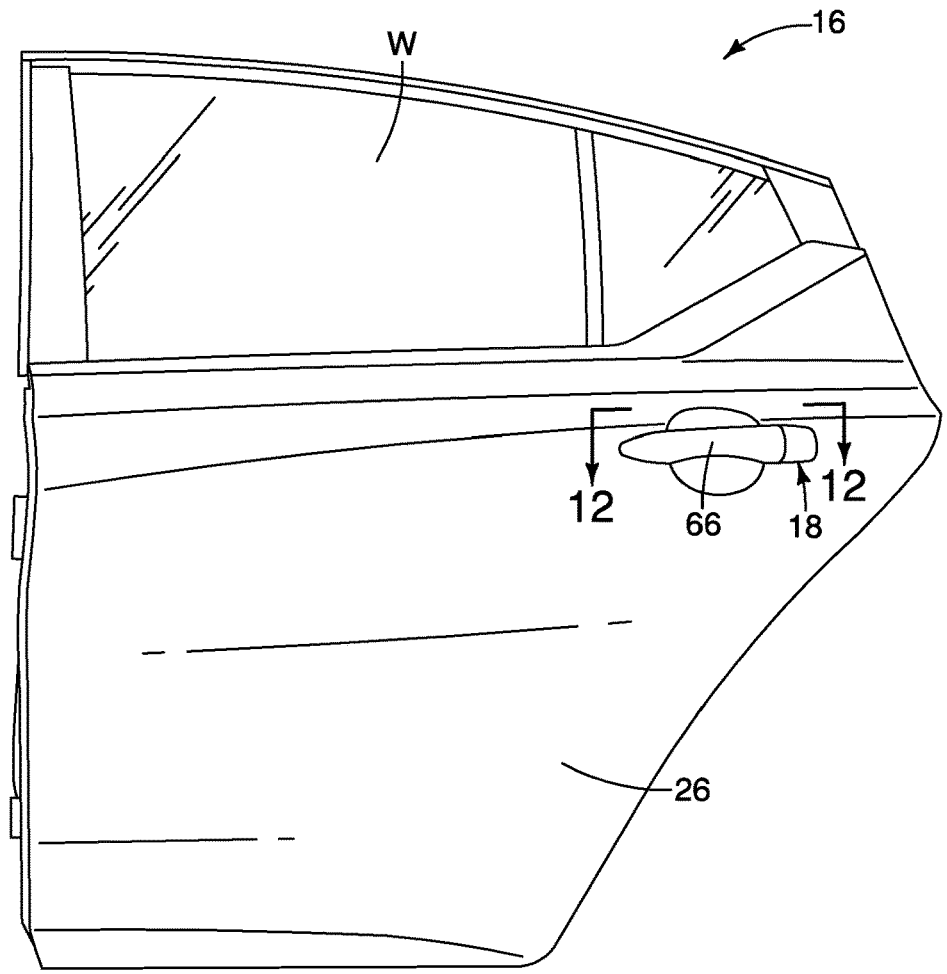
FIG. 2 is a side view of the vehicle door assembly removed from the vehicle in accordance with the first embodiment.

One of the rear doors 16 is shown removed from the vehicle 10 in FIG. 2. For the sake of brevity, only one of the rear doors 16 is described herein below. However, the description below of features of the rear door 16 applies equally to both rear doors 16.

The rear door 16 (also referred to as a vehicle door assembly) has a door handle assembly 18 that is manually operated to open the rear door 16 from outside the vehicle 10 in a conventional manner. A further description of some of the features of the door handle assembly 18 is provided below.

Figure 3:
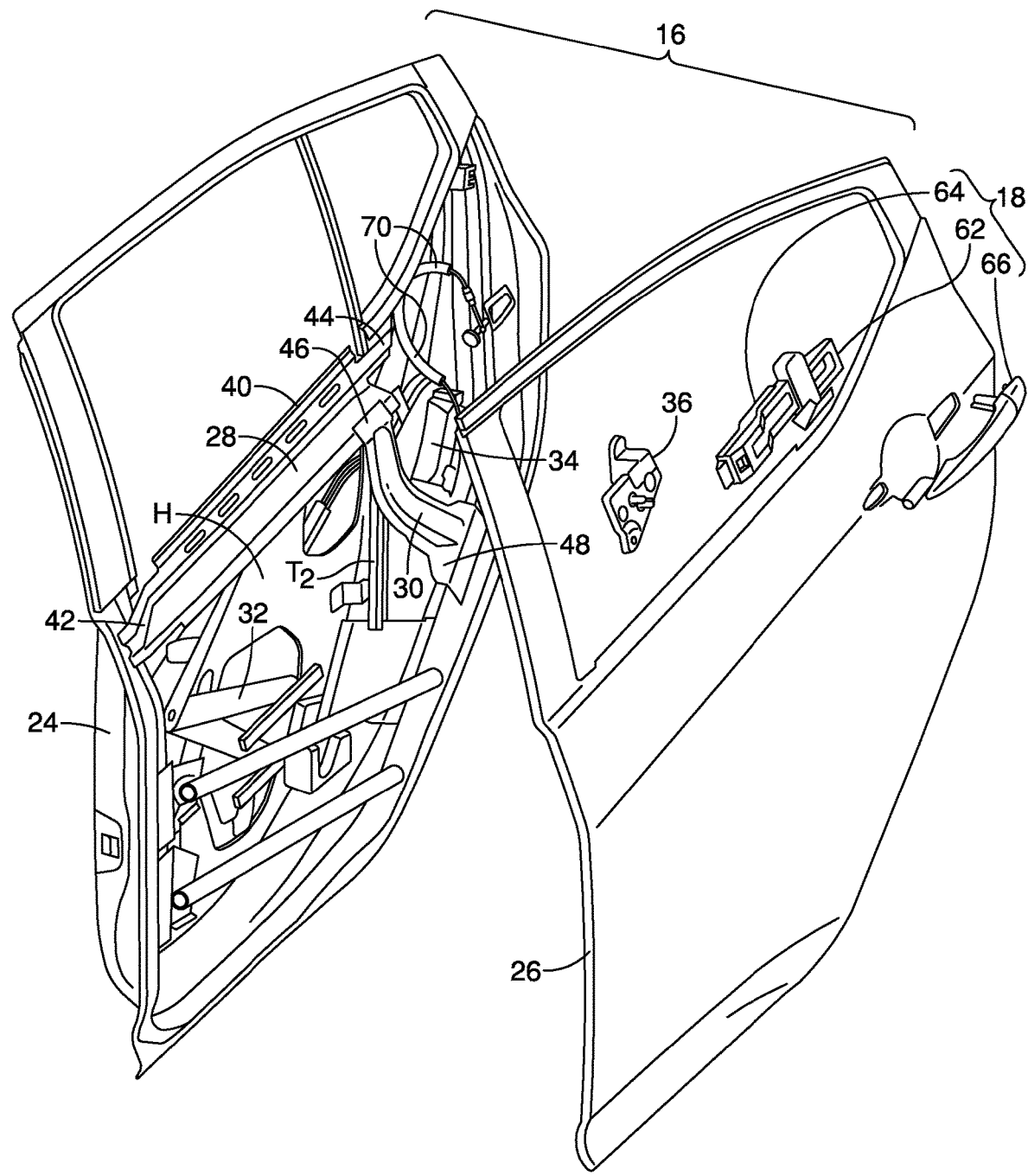
FIG. 3 is an exploded perspective view of the vehicle door assembly showing an inner door panel, an outer door panel and a vibration absorbing member in accordance with the first embodiment.

As shown in FIG. 3, the rear door 16 includes an inner door panel 24, an outer door panel 26, a main reinforcement beam 28, a first reinforcement beam 30, a window regulator mechanism 32, a latch mechanism 34, a vibration absorbing member 36 and the door handle assembly 18.

Figure 4:
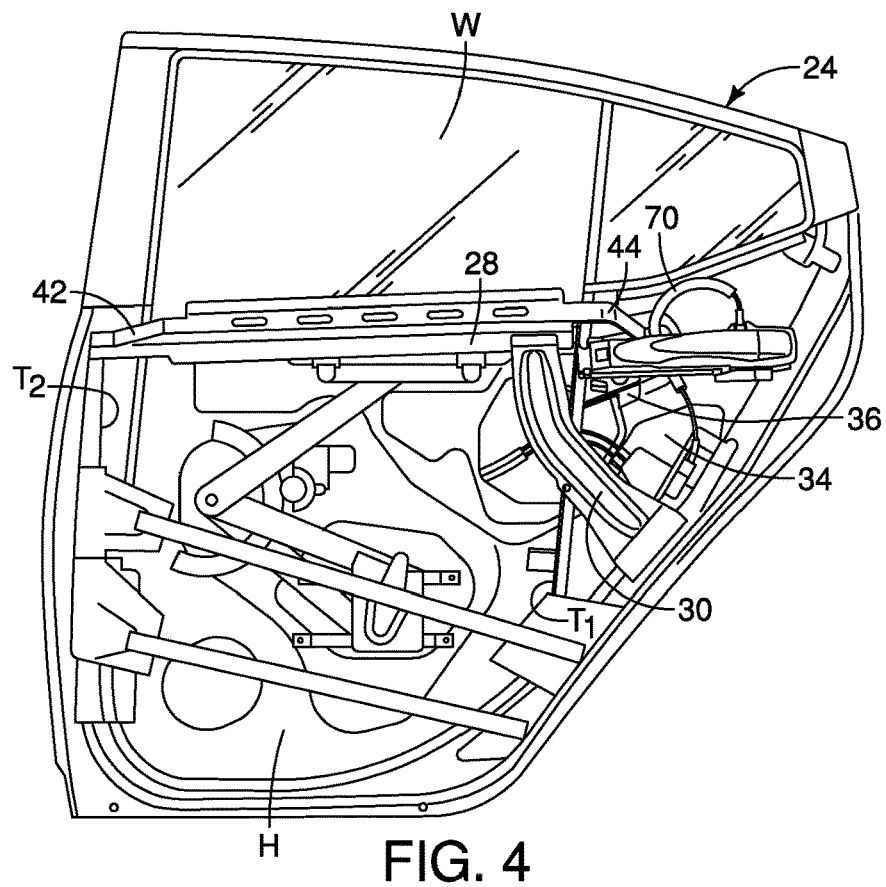
FIG. 4 is a side view of the vehicle door assembly with the outer door panel removed showing a main reinforcement beam, a first reinforcement beam, a window regulator mechanism with window track, a door handle assembly and the vibration absorbing member in accordance with the first embodiment.
Figure 5:
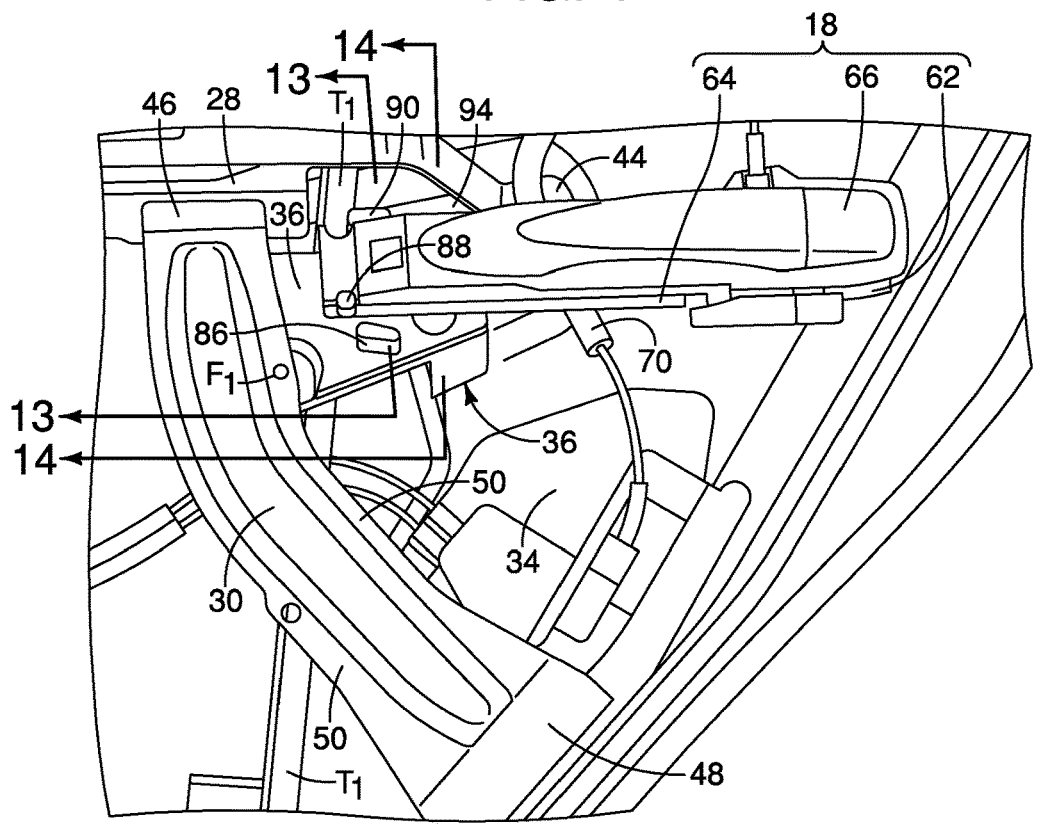
FIG. 5 is another side view showing a portion of the vehicle door assembly depicted in FIG. 4 showing further details of the main reinforcement beam, the first reinforcement beam, the window regulator mechanism with window tracks, the door handle assembly and the vibration absorbing member in accordance with the first embodiment.
Figure 6:
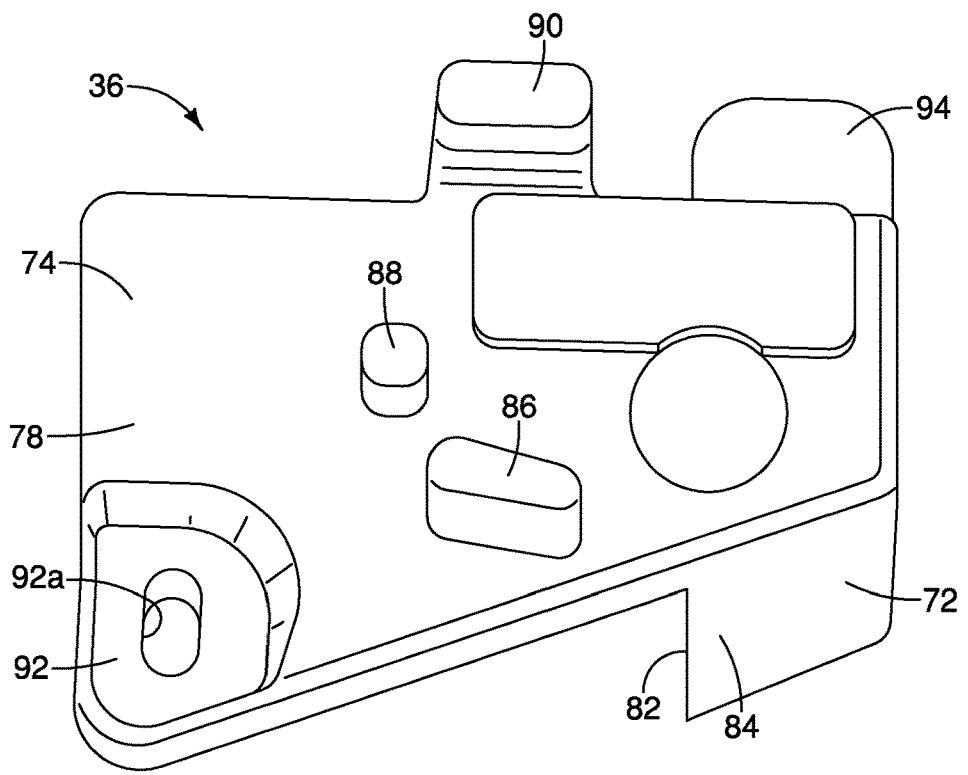
FIG. 6 is an outboard view of the vibration absorbing member removed from the vehicle showing an main body and a main projection that includes first, second and third protrusions that extend in an outboard direction from an outboard surface of the main projection and an attachment portion located in a lower forward corner of the main projection in accordance with the first embodiment.
Figure 7:
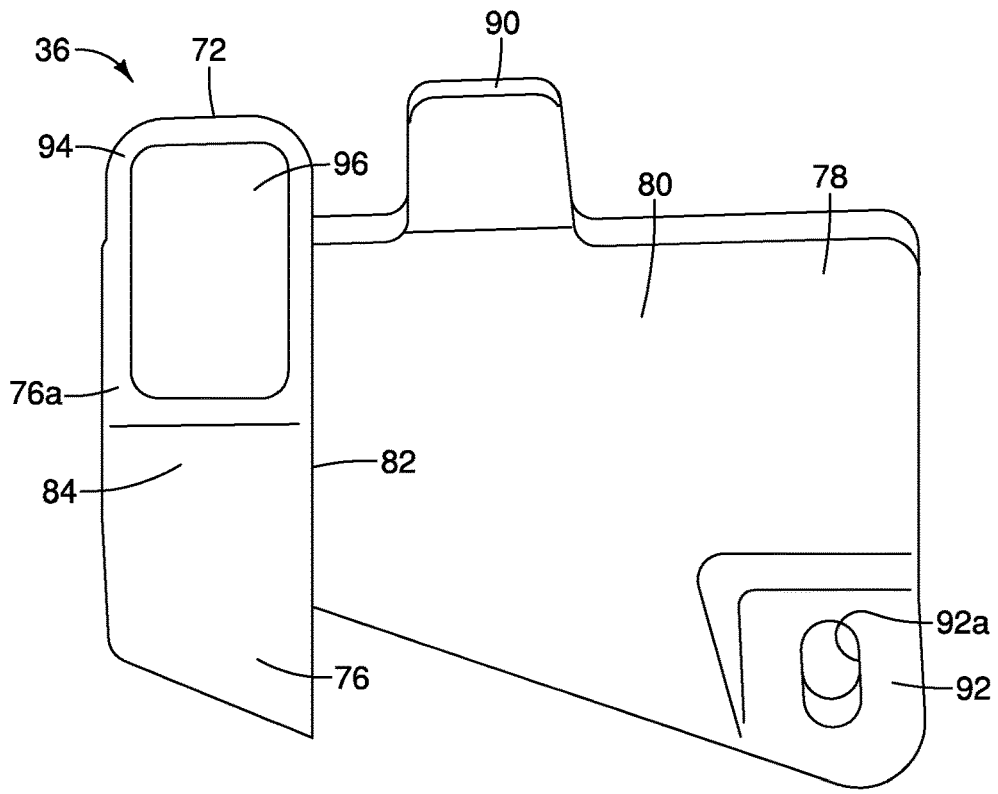
FIG. 7 is an inboard view of the vibration absorbing member removed from the vehicle showing inboard surfaces of both the main body and the main projection in accordance with the first embodiment.

As shown in FIGS. 3, 4 and 5, the inner door panel 24 defines a hollow recessed area or cavity H that is concealed with the outer door panel 26 attached to the inner door panel 24 and the door 16 fully assembled. It should be understood from the drawings and the description herein that the inner door panel 24 and the outer door panel 26 are rigidly fixed to one another along their respective outer peripheries in a conventional manner. For example, an outer periphery of the inner door panel 24 can fixed to a corresponding outer periphery of the outer door panel 26 via any of a variety of welding techniques. The cavity H is further defined as the space between the inner door panel 24 and the outer door panel 26.

The main reinforcement beam 28 (also referred to herein below as a main reinforcement bracket) is now described with reference to FIGS. 3-5. The main reinforcement beam 28 has an upper edge 40, a first end 42 and a second end 44. The upper edge 40 extends along a window opening and at least partially defines a slot (not shown) for window glass W. More specifically, with the door 16 fully assembled, the slot (not show) receives the glass window W which supported between window tracks $T_1$ and $T_2$ and by the window regulator mechanism 32 in a conventional manner. Specifically, as the window regulator mechanism 32 is operated, the glass window W is moved up and down along the tracks $T_1$ and $T_2$ that extend through the slot in a conventional manner.

The first end 42 of the main reinforcement beam 28 is fixed to a forward area of the inner door panel 24 by welding techniques. Similarly, the second end 44 of the main reinforcement beam 28 is fixed to a rearward area of the inner door panel 24 by welding techniques. Hence, the main reinforcement beam 28 is rigidly and fixedly attached to the inner door panel 24.

The first reinforcement beam 30 (also referred to as a first reinforcement bracket) is basically a curved beam having an upper end 46, a lower end 48 and reinforcement flanges 50. The upper end 46 of the first reinforcement beam 30 is welded or otherwise rigidly and fixedly attached to the main reinforcement beam 28 forward of the track $T_1$ of the window regulator mechanism 32. The first reinforcement beam 30 extends downward from the main reinforcement beam 28 and rearward curving toward a rearward edge of the inner door panel 24. The lower end 48 is welded or otherwise rigidly and fixedly attached a rearward portion of the inner door panel 24 below the latch mechanism 34. A mid-section of the first reinforcement beam 30 is located outboard of the track $T_1$ of the window regulator mechanism 32.

The window regulator mechanism 32 includes a crank or motorized mechanism that is operated by a vehicle passenger to move the window glass W up and down along the window tracks $T_1$ and $T_2$. The window tracks $T_1$ and $T_2$ are fixedly installed to the inner door panel 24 in a conventional manner and are parallel to one another. The window track $T_1$ is located rearward of the window track $T_2$. The window tracks $T_1$ and $T_2$ are also located within the cavity H. The rearward window track $T_1$ is also disposed between an outboard surface of the inner door panel 24 and the first reinforcement beam 30 within the cavity H. As shown in FIGS. 4 and 5, the upper end 46 of the first reinforcement beam 30 is located forward of the window track $T_1$ and the lower end 48 of the first reinforcement beam 30 is located rearward of the window track $T_1$.

The latch mechanism 34 is fixed via mechanical fasteners (not shown) in a conventional manner to the inner door panel 24 within the cavity H. Since latch mechanisms are well known in the art, further description is omitted for the sake of brevity.

An explanation of operation of the latch releasing mechanism similar and optionally identical to the latch mechanism 34 is presented in, for example, see U.S. Pat. No. 7,568,744. Therefore, further description is omitted for the sake of brevity.

As shown in FIG. 3, the door handle assembly 18 basically includes a handle base bracket 62, a metallic reinforcement bracket 64 and an operation handle 66. The door handle assembly 18 is installed to the outer door panel 26 such that the operation handle 66 is located along an outboard surface of the outer door panel 26 and the handle base bracket 62 and metallic reinforcement bracket 64 are inboard of the outer door panel 26 within the cavity H. The door handle assembly 18 is connected to the latch mechanism 34 by a cable 70 in a conventional manner.

The basic operation of the door handle assembly 18 is generally known. Examples of similar door handle assemblies are described in, for example, U.S. Pat. No. 7,568,744, issued Aug. 4, 2009, U.S. Ser. No. 16/264,927, filed Feb. 1, 2019 and U.S. Ser. No. 16/264,952, filed Feb. 1, 2019. The entire contents of U.S. Pat. No. 7,568,744, U.S. Ser. No. 16/264,927 and U.S. Ser. No. 16/264,952 are incorporated herein by reference in their entirety. Therefore, description basic operation of the door handle assembly 18 will be omitted for the sake of brevity.

As shown in FIGS. 4 and 5, the vibration absorbing member 36 is installed within the cavity H and is fixed to an inboard facing surface of the first reinforcement beam 30 via a fastener Fi.

As shown in FIGS. 6-11 removed from the rear door 16, the vibration absorbing member 36 includes a main body 72 that defines an outboard surface 74 (FIGS. 6, 8, 9 and 11), an inboard surface 76 (FIGS. 7-10) and a main projection 78 that extends forward from the main body 72 when installed within the cavity H of the rear door 16. The main projection 78 and the main body 72 are continuous along an outboard side of the vibration absorbing member 36 and therefore, define the same outboard surface 74.

Basically, the main projection 78 of the main body 72 defines a forward section of the vibration absorbing member 36 and the remainder of the main body 72 defines a rearward section 84 of the main body 72. The rearward section 84 has a thickness measured in a vehicle lateral direction ($D_O$ and/or $D_I$) that is greater than a thickness of the forward section 78 (the main projection 78). More specifically, the rearward section 84 of the main body 72 has an overall thickness that is several times the thickness of the main projection 78 (the forward section 78). The main projection 78 defines an inboard surface 80 that is offset and separated from the inboard surface 76 of the rearward section 84. Further, the main body defines a forward surface 82 that extends from the inboard surface 76 to the inboard surface 80.

The outboard surface 74 along the main projection 78 includes a first protrusion 86, a second protrusion 88 and a third protrusion 90. Each of the first protrusion 86, the second protrusion 88 and the third protrusion 90 extends in the outboard direction $D_O$ with the vibration absorbing member 36 installed within the rear door 16.

Figure 13:
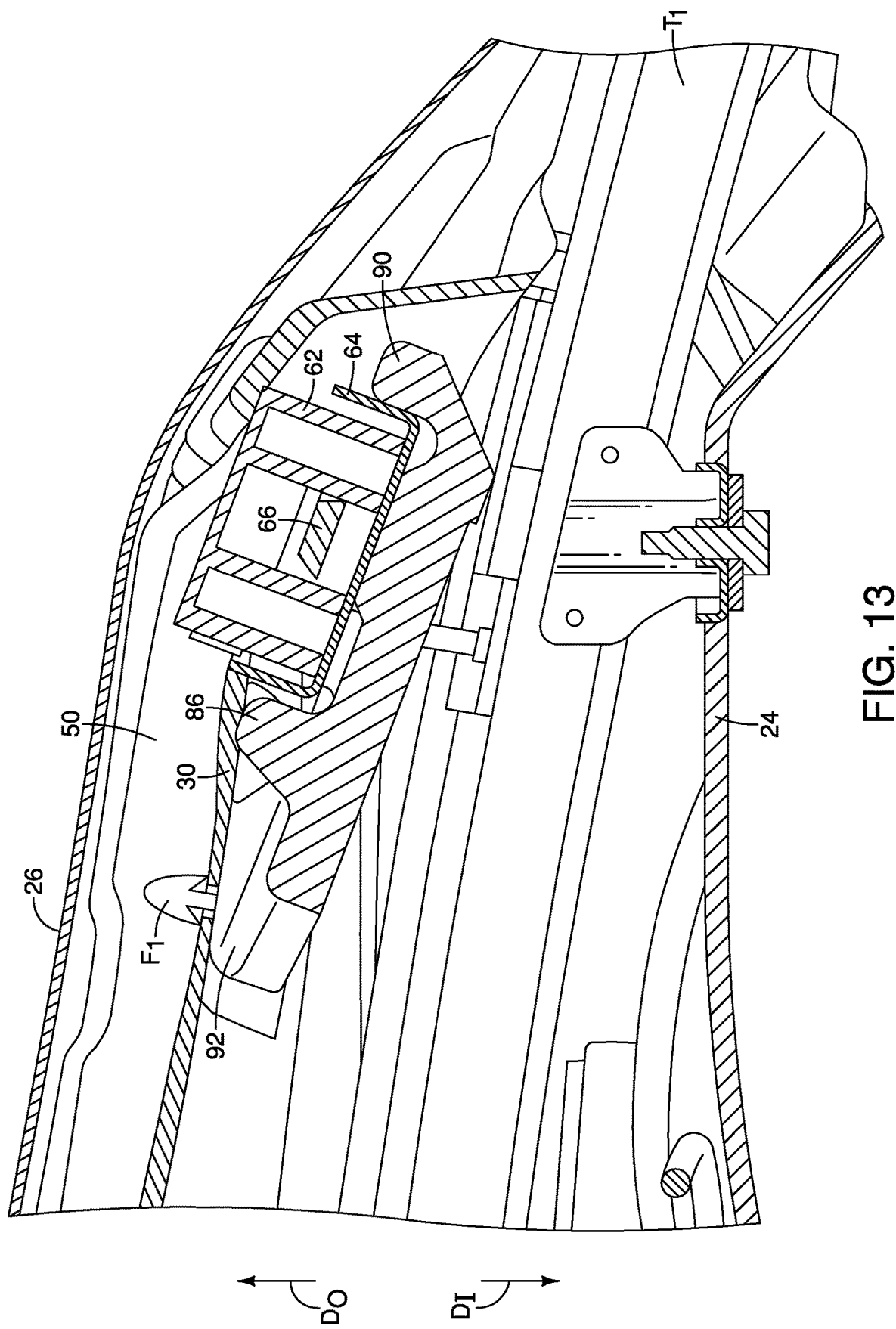
FIG. 13 is another cross-sectional top view taken along the line 13-13 in FIG. 5, showing further details of the relationships between the window track, the vibration absorbing member and the door handle assembly in accordance with the first embodiment.
Figure 14:
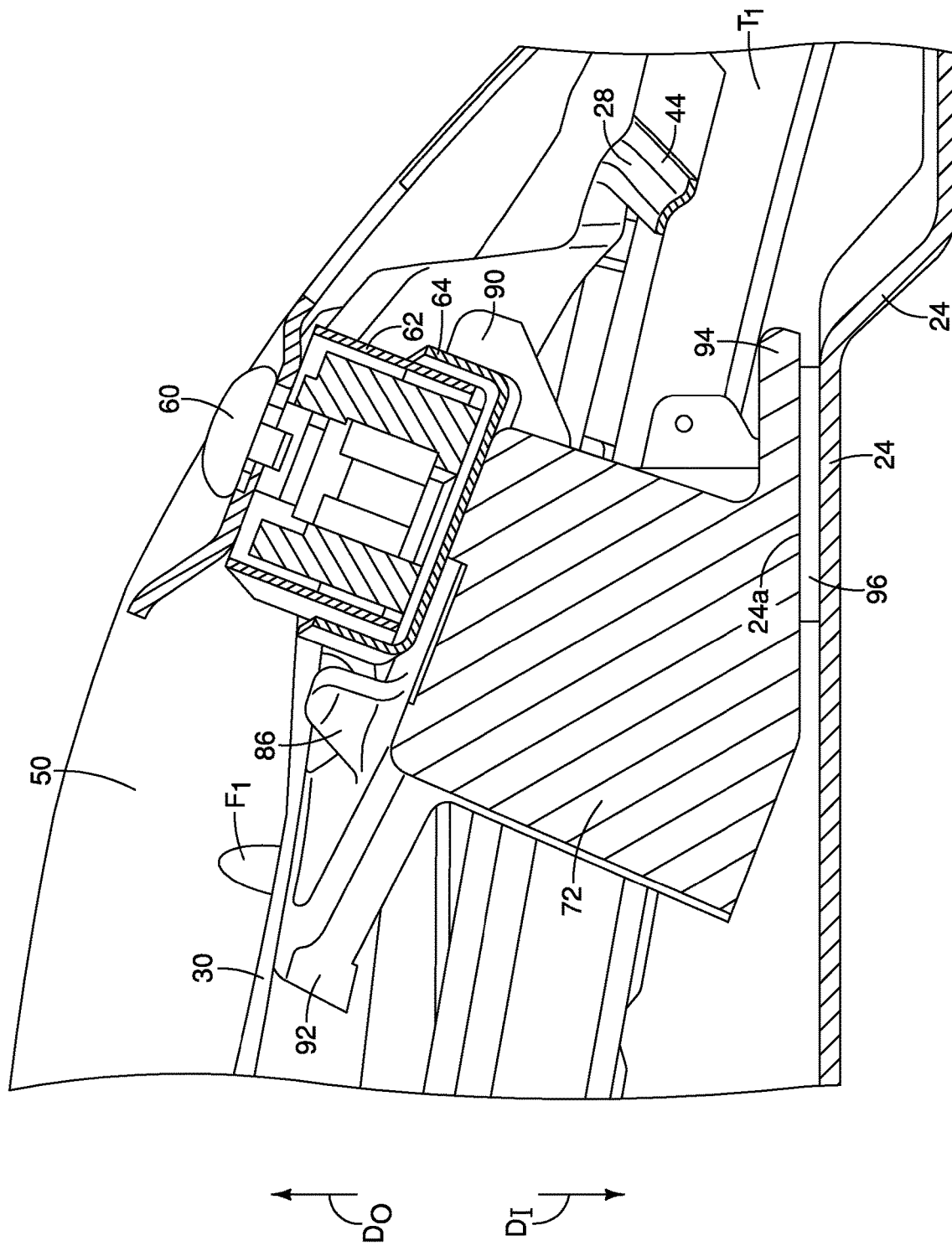
FIG. 14 is another cross-sectional top view taken along the line 13-13 in FIG. 5, showing further details of the relationships between the window track, the vibration absorbing member, the inner door panel, the main reinforcement beam and the door handle assembly in accordance with the first embodiment.
Figure 15:
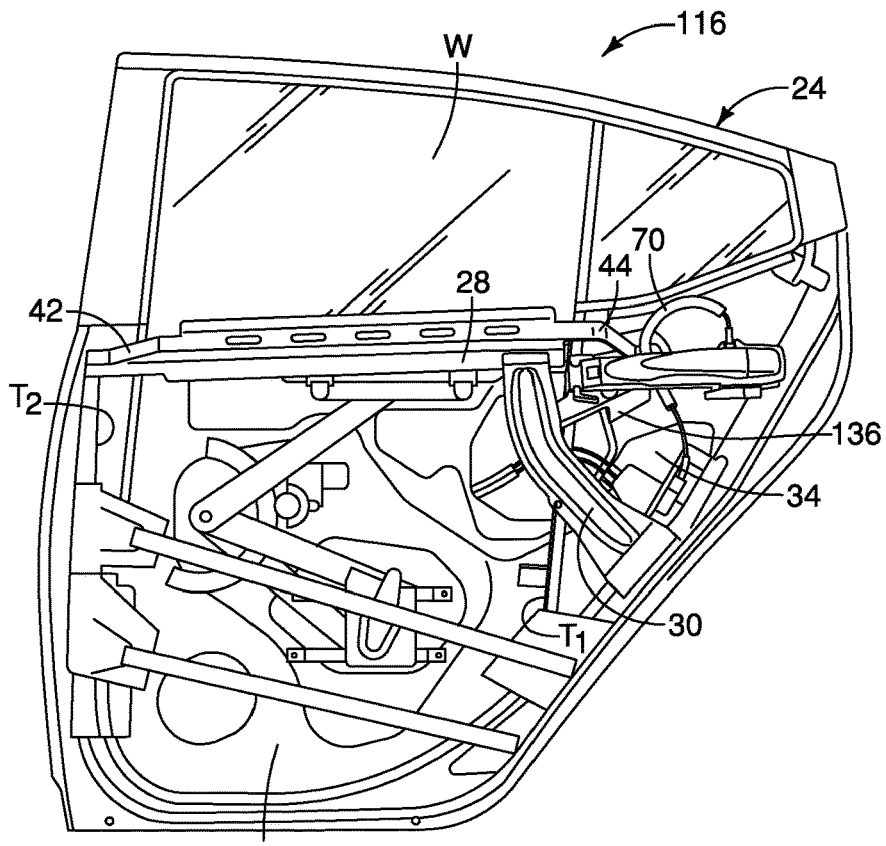
FIG. 15 is a side view of a vehicle door assembly with the outer door panel removed showing the main reinforcement beam, the first reinforcement beam, the window regulator mechanism with window track, the door handle assembly and a vibration absorbing member in accordance with a second embodiment.

The first protrusion 86 is positioned such that with the rear door 16 fully assembled, the first protrusion 86 extends in the outboard direction $D_O$ below and slightly spaced apart from a bottom edge of the handle base bracket 62 and the metallic reinforcement bracket 64 of the door handle assembly 18, as shown in FIGS. 5, 13 and 14.

Figure 12:
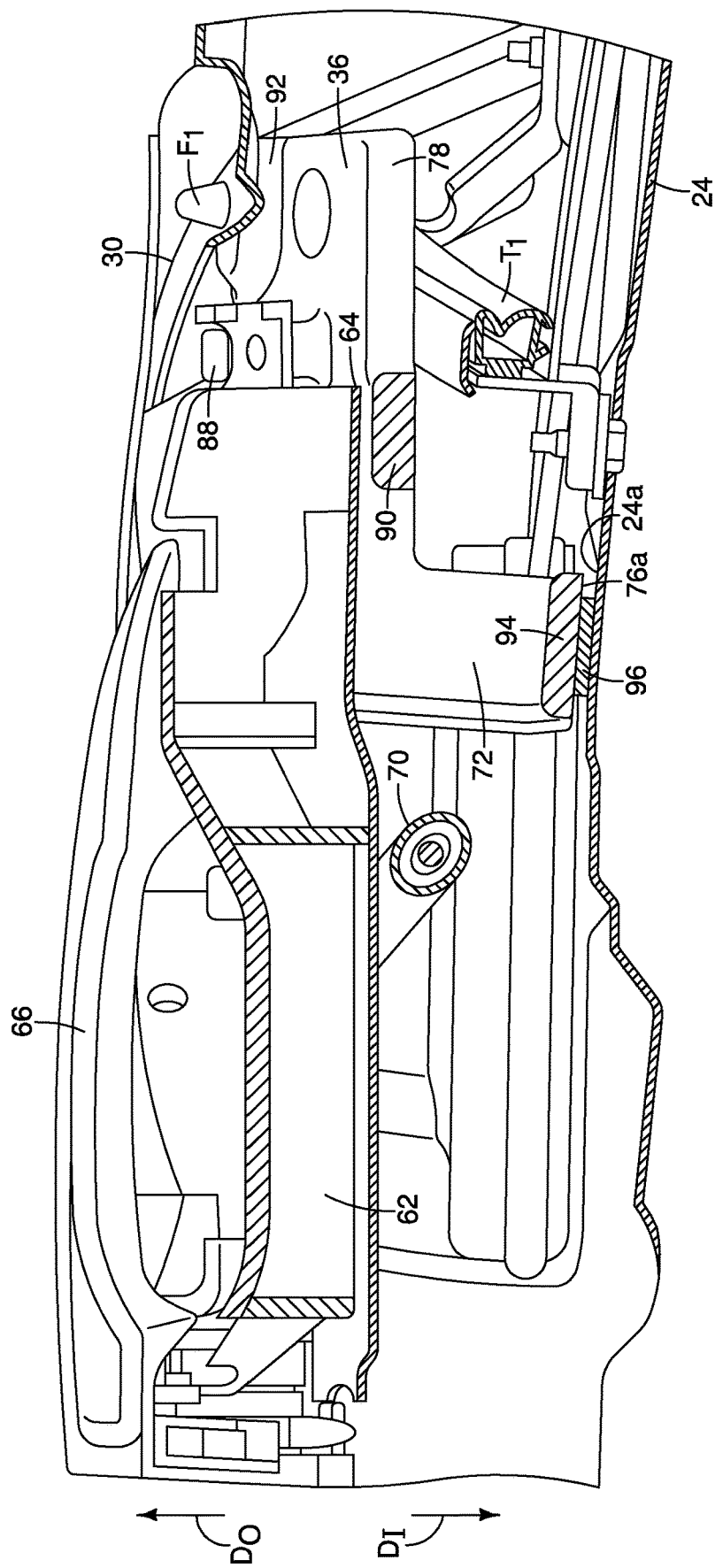
FIG. 12 is a cross-sectional top view taken along the line 12-12 in FIG. 2, showing the relationships between the window track, the vibration absorbing member and the door handle assembly in accordance with the first embodiment.

The second protrusion 88 is positioned such that with the rear door 16 fully assembled, the second protrusion 88 extends into a curved recess defined along a forward bottom edge of the handle base bracket 62 of the door handle assembly 18, as shown in FIGS. 5 and 12.

The third protrusion 90 is positioned such that with the rear door 16 fully assembled, the third protrusion 90 extends above a forward area of the handle base bracket 62 and the metallic reinforcement bracket 64 of the door handle assembly 18, as shown in FIGS. 5, 13 and 14.

A lower forward end of main projection 78 includes an attachment portion 92 with an opening 92a. As shown in FIGS. 5, 12, 13 and 14, a fastener Fi is inserted into the opening 92a and into a corresponding opening (not shown) in the first reinforcement beam 30, fixing the vibration absorbing member 36 to the first reinforcement beam 30.

Figure 8:
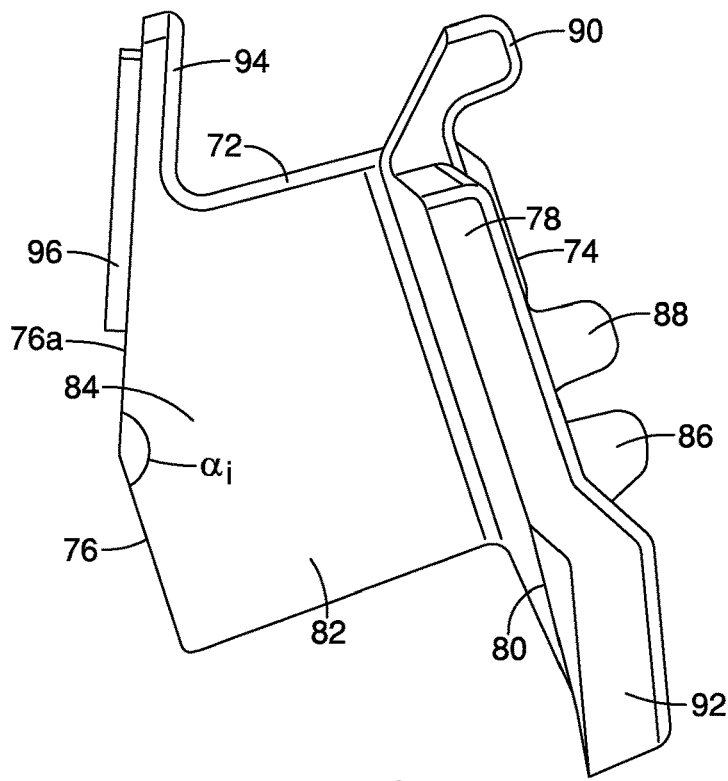
FIG. 8 is a front view of the of the vibration absorbing member removed from the vehicle showing forward facing surfaces of both the main body and the main projection along with the first, second and third projections and the attachment portion in accordance with the first embodiment.
Figure 9:
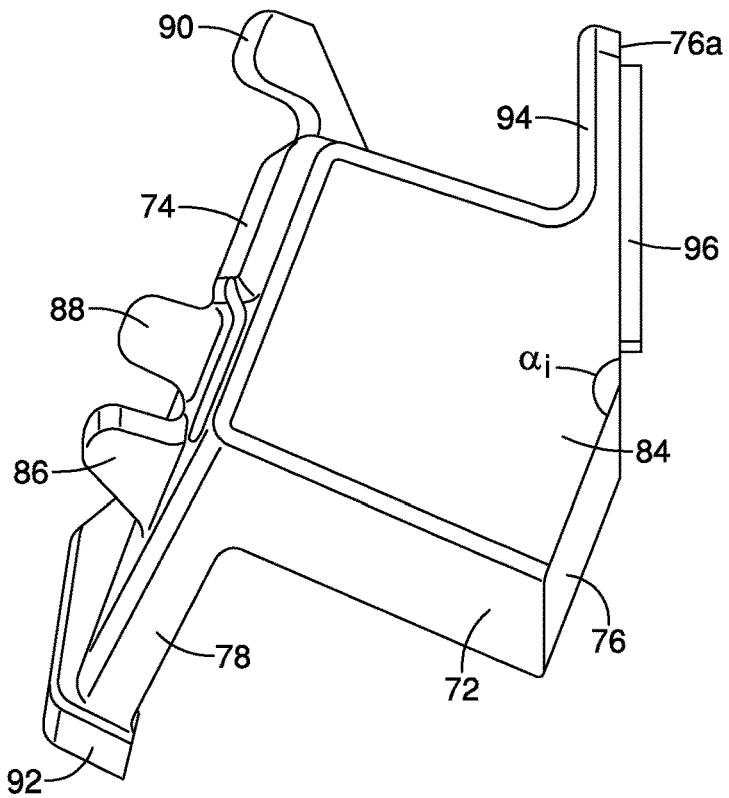
FIG. 9 is a rear view of the of the vibration absorbing member removed from the vehicle showing rearward facing surfaces of the main body along with the first, second and third projections and the attachment portion in accordance with the first embodiment.
Figure 10:
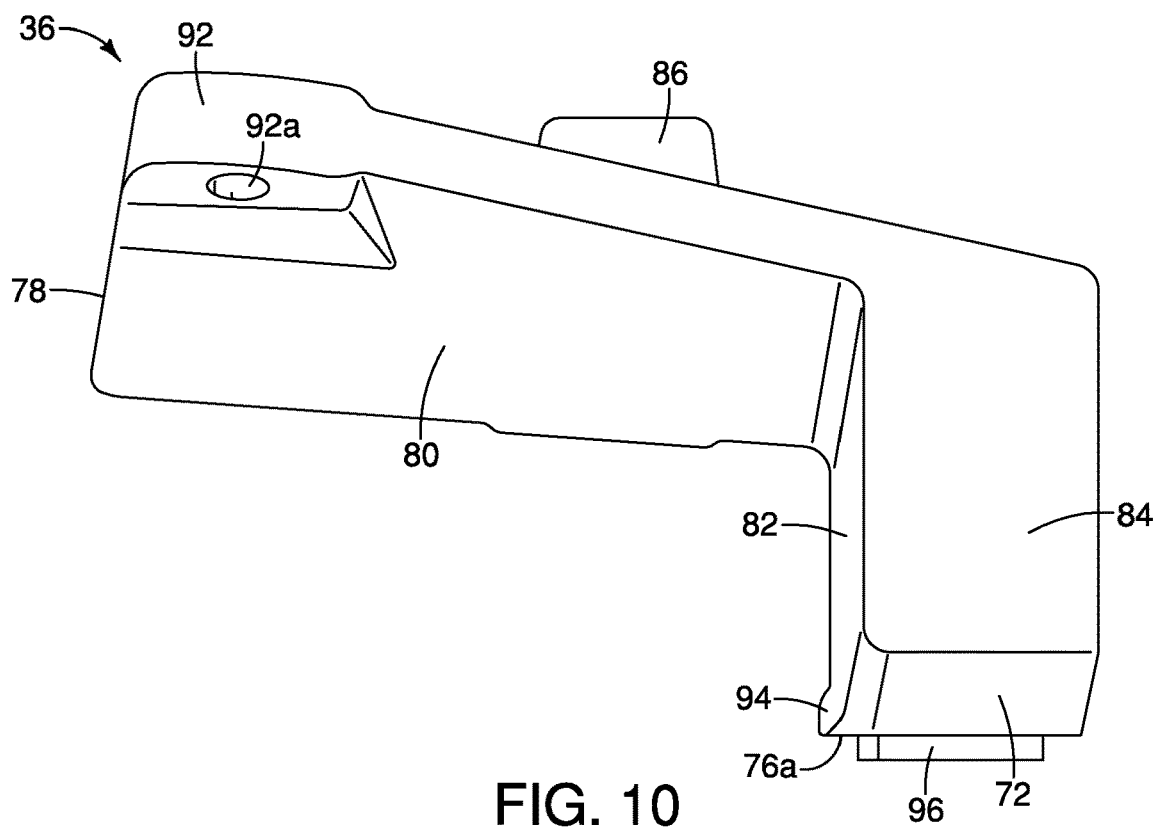
FIG. 10 is a bottom view (looking upward) of the of the vibration absorbing member removed from the vehicle showing the main body and the main projection in accordance with the first embodiment.
Figure 11:
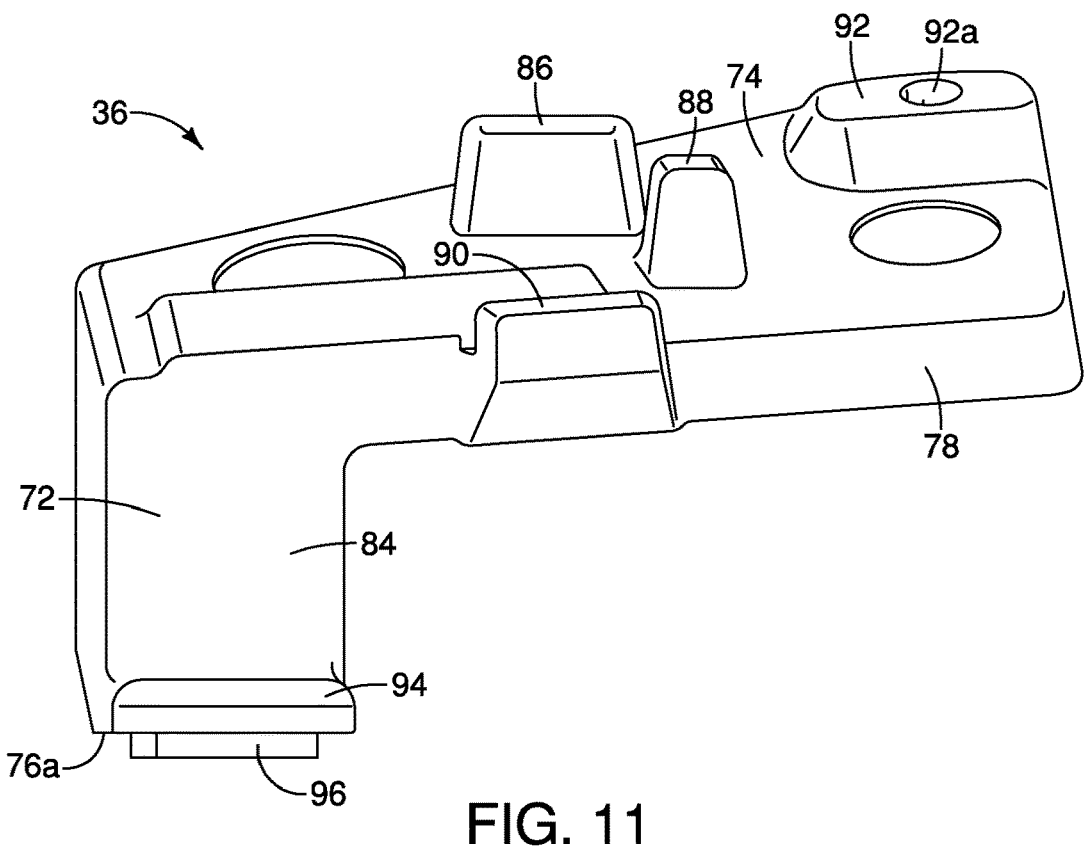
FIG. 11 is a top view (looking downward) of the of the vibration absorbing member removed from the vehicle showing the main body and the main projection along with the first, second and third projections and the attachment portion in accordance with the first embodiment.

The main body 72 includes a rearward projection 94 that extends upward from the rearward section 84, as shown in FIGS. 6-11. A lower portion of the inboard surface 76 is approximately parallel to the outboard surface 74 of the vibration absorbing member 36, as shown in FIGS. 8 and 9. An upper portion 74a of the inboard surface 76 extends along the rearward projection 94. The upper portion 74a of the inboard surface 76 and the lower portion of the inboard surface 76 define an obtuse angle $\alpha_1$ there between that is between 10-25 degrees, as shown in FIGS. 8 and 9. The upper portion 74a of the outboard surface 74 is positioned and oriented to extend toward an outboard surface 24a of the inner door panel 24, as shown in FIGS. 12 and 14. The upper portion of the outboard surface 74 includes a flexible and compressible pad 96 that is fixed thereto, as shown in FIGS. 7-12 and 14. The pad 96 can be a thick double sided tape or other self-adhering material with compressibility and resilience.

As shown in FIGS. 8 and 9, the outboard surface 74 is inclined relative to a vertical direction when installed within the rear door 16. In other words, the views of FIGS. 8 and 9 show the actual orientation of the vibration absorbing member 36 as installed within the rear door 16. An outboard surface of the rear door 16 is contoured such that the outboard surface 74 is inclined as shown in the front and rear views in FIGS. 8 and 9. However, the inner door panel 24 is typically vertically oriented or only slightly inclined relative to vertical within the passenger compartment of the vehicle. As a result, the upper portion 76a of the inboard surface 76 of the main body 72 is approximately vertical.

The rearward projection 94 further extends upward such that it extends inboard of second end 44 of the main reinforcement beam 28, as shown in FIGS. 5 and 14.

With the vibration absorbing member 36 installed within the rear door 16, the main projection 78 (the forward section) of the main body 72 extends in the vehicle longitudinal direction $D_L$ outboard of the window track $T_1$ and from a location rearward of the window track $T_1$ to the first reinforcing bracket 30. The main projection 78 (the forward section) of the main body 72 has a non-contacting relationship with the window track $T_1$ with the outer door panel 26 and inner door panel 24 in a non-deformed state. Further, the main projection 78 of the vibration absorbing member 36 is located inboard of a mid-section of first reinforcement beam 30.

The vibration absorbing member 36 is formed as a single monolithic unitary element from a polymer-based foam material. For example, the vibration absorbing member 36 can be made of a foam material that is selected for characteristics that absorb energy during an impact event and dampen vibrations. One such foam material is polypropylene that is injection molded such that during the molding process the polypropylene expands up to five times its original unexpanded volume.

The flexible and compressible pad 96 that is attached to the vibration absorbing member 36 for contact with the outboard surface of the inner door panel 24 can be made of any of a variety of a variety of flexible and compressible materials. One example of such a flexible and compressible material is ethylene propylene diene monomer (EPDM), although any material with similar flexible and compressible properties can be employed for the flexible and compressible pad 96.

The above described rear door 16 and the vibration absorbing member 36 provide several benefits over door assemblies without such structures. First, the vibration absorbing member 36 is disposed between the first reinforcement beam 30 and the inner door panel 24. Further, the vibration absorbing member 36 disposed between the door handle assembly 18 and the inner door panel 24 reducing vibrations that may occur within the rear door 16. Second, in response to a side impact event in which impacting forces are applied to the outer door panel 26, the inclusion of the metallic reinforcement bracket 64 reduces the possibility of deformation of the handle base bracket 62. Also, since the vibration absorbing member 36 is located between the metallic reinforcement bracket 64 and the inner door panel 24, overall movement of the door handle assembly 18 is limited during a side impact event where the impact is located in a central area of the outer door panel 26.

The vibration absorbing member 36 being located between the metallic reinforcement bracket 64 and inner door panel 24 establishes a direct relationship between the door handle assembly 18 and the inner door panel 24, ensuring greater rigidity that is significantly greater than the rigidity of the door handle assembly 18 and alone in response to a side impact event during which impacting forces are applied to the outer door panel 26. More specifically, if the outer door panel 26 experiences impacting forces in the vicinity of the door handle assembly 18, the vibration absorbing member 36 absorbs a portion of that impact energy as it compresses and further transmits a portion of the impact energy directly to the inner door panel 24.

Further, during an impact event, if the impacting forces acting on the outer door panel 26 are sufficient to provide deformation that causes the door handle assembly 18 to move inboard toward the inner door panel 24, impacting forces are transmitted through the vibration absorbing member 36 causing it to move toward and into contact with the window track $T_2$. Consequently, a portion of the impacting forces are transmitted to the window track $T_2$, as well as to the inner door panel 24. Hence, the inclusion of the vibration absorbing member 36 directs impact forces away from the door handle assembly 18 and the latch mechanism 34. Further, the vibration absorbing member 36 further reduces and/or eliminates the possibility of the door latch mechanism 34 from inadvertently being opened (for example, allowing the door 16 to open) in response to an impact event. As well, the vibration absorbing member 36 further reduces and/or eliminates the possibility of the door handle assembly 18 from undergoing opening movements that might cause the door latch mechanism 34 from opening the rear door 16 during an impact event.

It should be understood from the drawings and the description herein that the above structures can also be utilized in the front door 14.

Second Embodiment

Referring now to FIGS. 15-25, a rear door 116 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the rear door 116 is identical to the rear door 16 of the first embodiment, except that the vibration absorbing member 36 of the first embodiment has been replaced with a vibration absorbing member 136, as described herein below. Since the rear door 116 is otherwise identical to the rear door 16 of the first embodiment, the descriptions of the parts of the rear door 116 that are identical to the parts of the rear door 16 are omitted for the sake of brevity.

As shown in 15 and 16, the vibration absorbing member 136 is installed within the hollow or cavity H partially defined by the inner door panel 24. The vibration absorbing member 136 is also fixed to the inboard facing surface of the first reinforcement beam 30 via the fastener $F_1$.

As shown in FIGS. 17-22 removed from the rear door 116, the vibration absorbing member 136 includes a main body 172 that defines an outboard surface 174, an inboard surface 176 and a main projection 178 that extends forward from the main body 172 when installed within the cavity H of the rear door 116. The main projection 178 and the main body 172 are continuous along an outboard side of the vibration absorbing member 136 and therefore, define the same outboard surface 174.

Basically, the main projection 178 of the main body 172 defines a forward section of the vibration absorbing member 136 and the remainder of the main body 172 defines a rearward section 184 of the main body 172. The rearward section 184 has a thickness measured in a vehicle lateral direction ($D_O$ and/or $D_I$) that is greater than a thickness of the forward section 178 (the main projection 178). More specifically, the rearward section 184 of the main body 172 has an overall thickness that is several times the thickness of the main projection 178 (the forward section 178). The main projection 178 defines an inboard surface 180 that is offset and separated from the inboard surface 176 of the rearward section 84. Further, the main body defines a forward surface 182 that extends from the inboard surface 176 to the inboard surface 180.

The outboard surface 174 along the main projection 178 includes a U-shaped protrusion that is defined by a first portion 186, a second portion 188 and a third portion 190 that are all joined together without breaks or spaces therebetween. Each of the first portion 186, the second portion 188 and the third portion 190 extends in the outboard direction $D_O$ with the vibration absorbing member 136 installed within the rear door 116.

The first portion 186 is positioned such that with the rear door 116 fully assembled, the first portion 186 extends in the outboard direction $D_O$ below and slightly spaced apart from a bottom edge of the handle base bracket 62 and the metallic reinforcement bracket 64 of the door handle assembly 18, as shown in FIGS. 16, 23-24 and 26.

Figure 16:
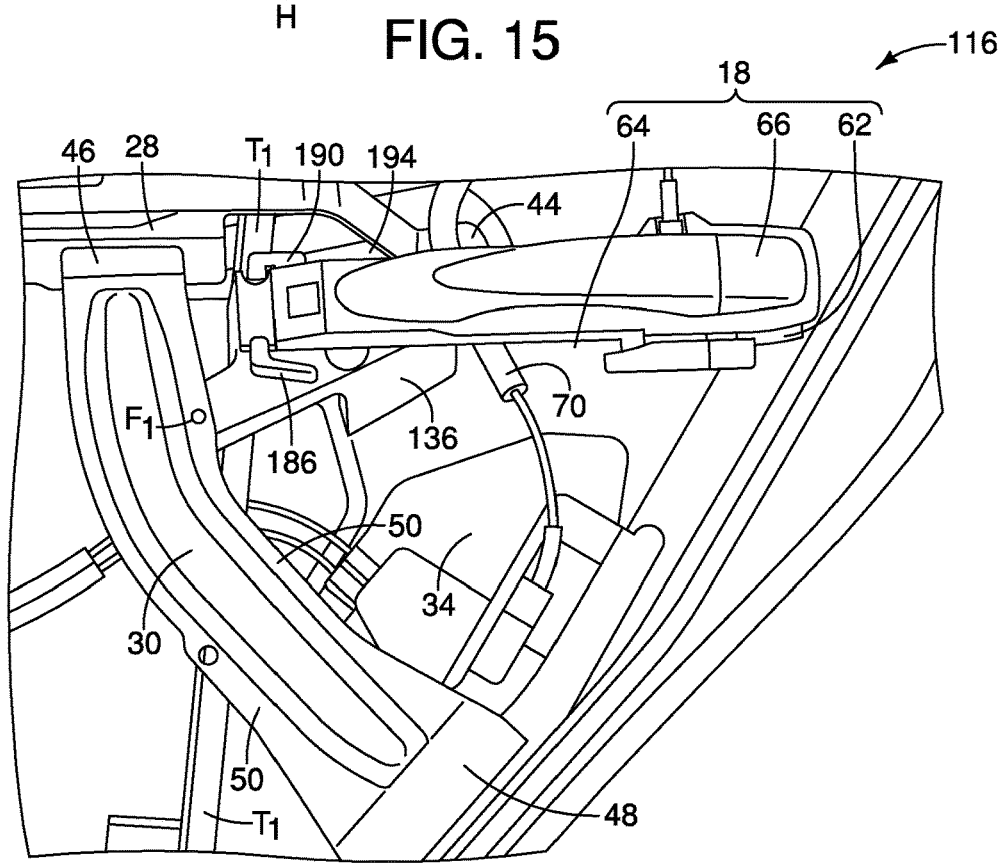
FIG. 16 is another side view showing a portion of the vehicle door assembly depicted in FIG. 15 showing further details of the main reinforcement beam, the first reinforcement beam, the window regulator mechanism with window tracks, the door handle assembly and the vibration absorbing member in accordance with the second embodiment.
Figure 17:
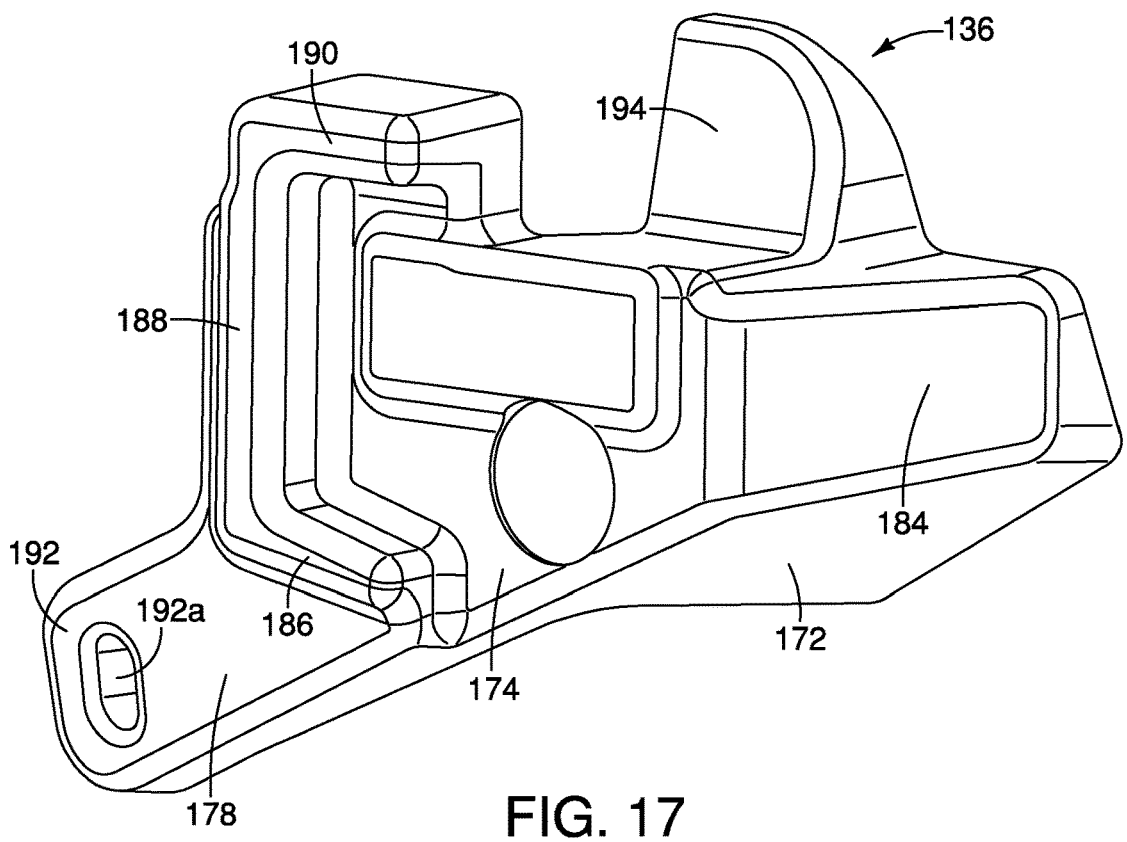
FIG. 17 is an outboard perspective view of the vibration absorbing member removed from the vehicle showing an main body and a main projection that includes a U-shaped protrusion with first, second and third portions that extend in an outboard direction from an outboard surface of the main projection and an attachment portion located in a lower forward corner of the main projection in accordance with the second embodiment.
Figure 18:
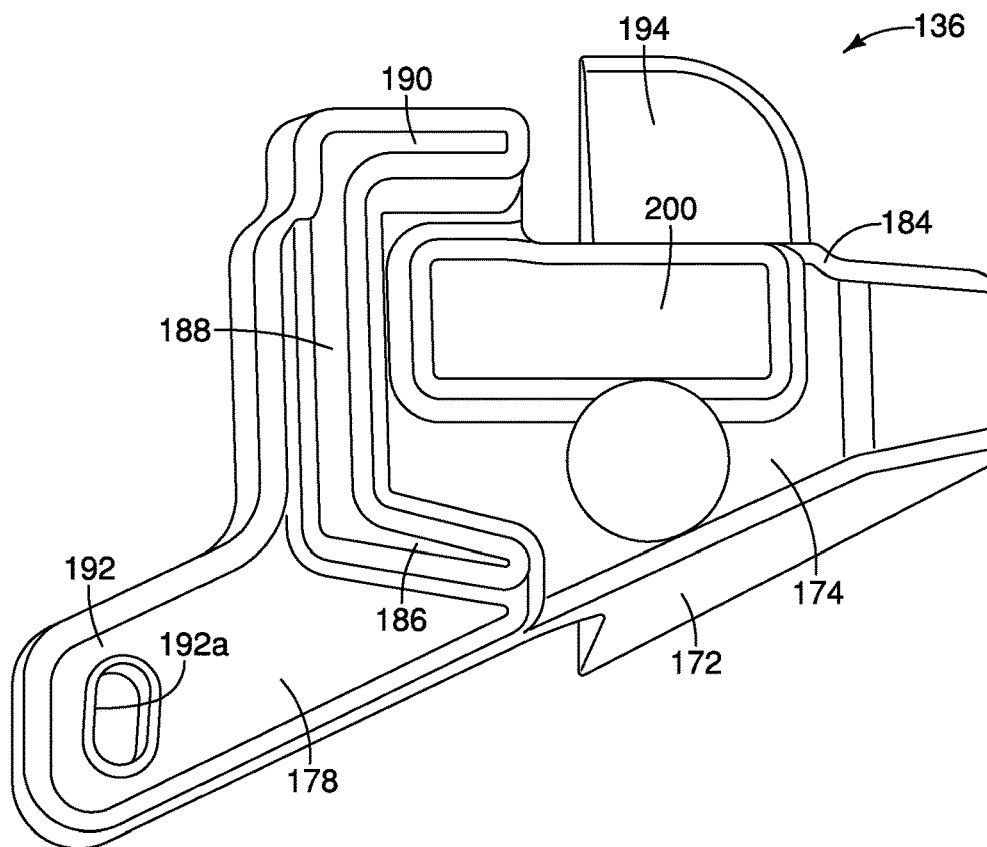
FIG. 18 is an outboard side view of the vibration absorbing member showing the main body and the main projection with the first, second and third portions of the U-shaped protrusion and the attachment portion located in the lower forward corner of the main projection in accordance with the second embodiment.
Figure 19:
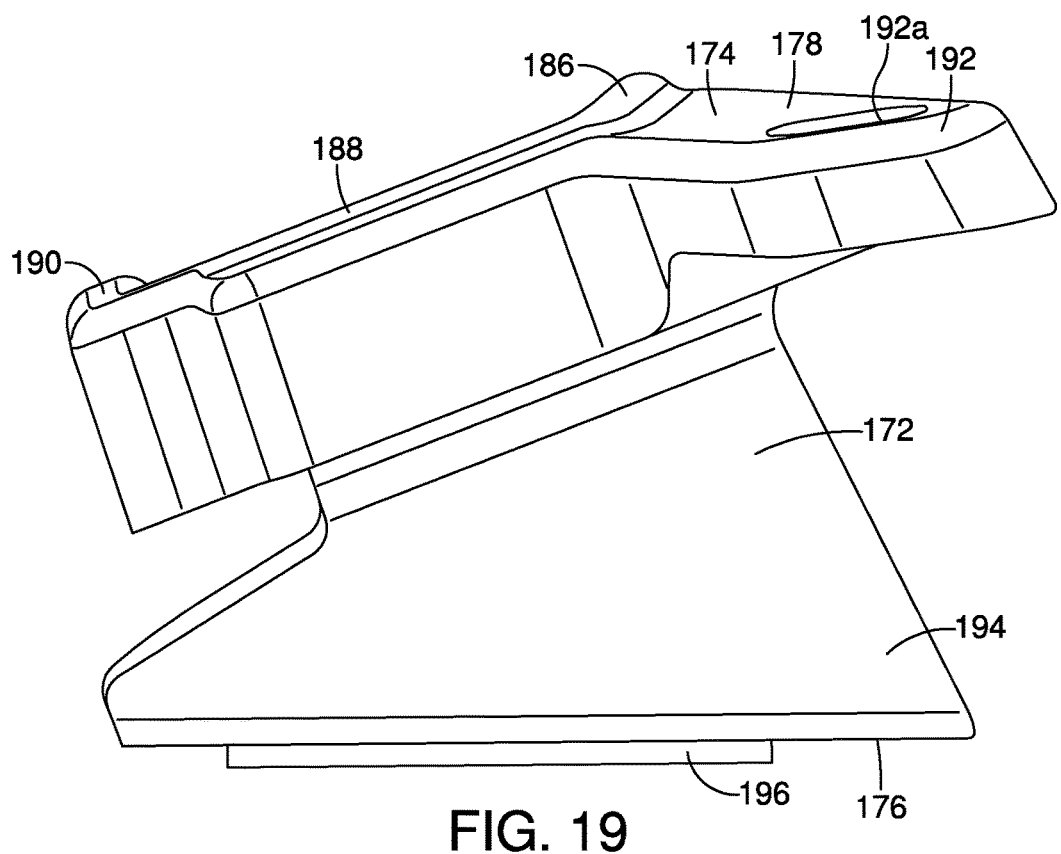
FIG. 19 is a front view of the vibration absorbing member rotated 90 degrees counterclockwise, showing the main projection in accordance with the second embodiment.
Figure 20:
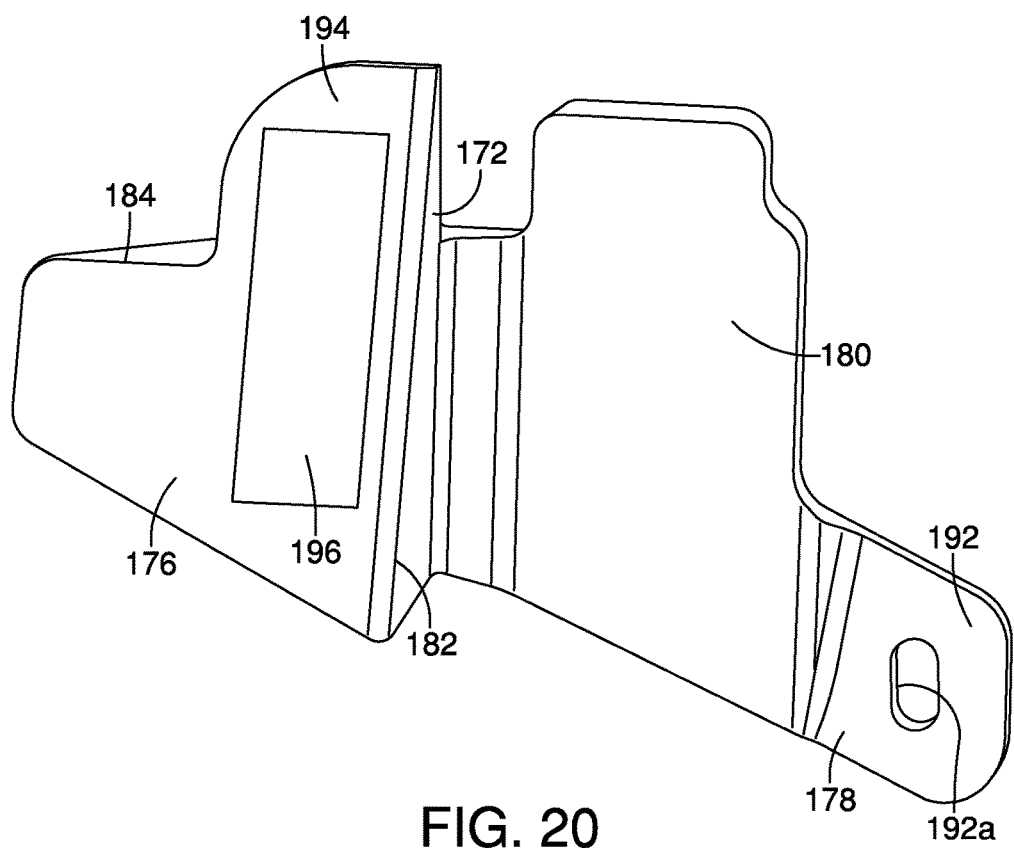
FIG. 20 is an inboard view (looking outboard) of the vibration absorbing member showing inboard surfaces of both the main body and the main projection in accordance with the second embodiment.
Figure 21:
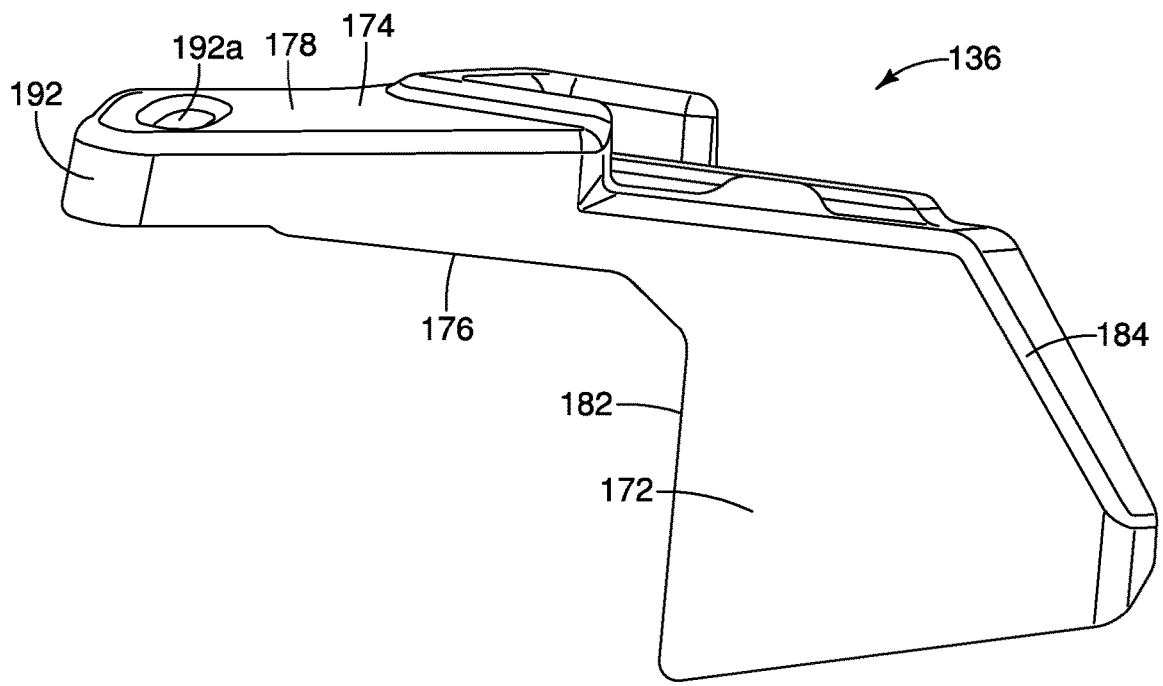
FIG. 21 is a bottom view (looking upward) of the of the vibration absorbing member showing the main body and the main projection in accordance with the second embodiment.
Figure 22:
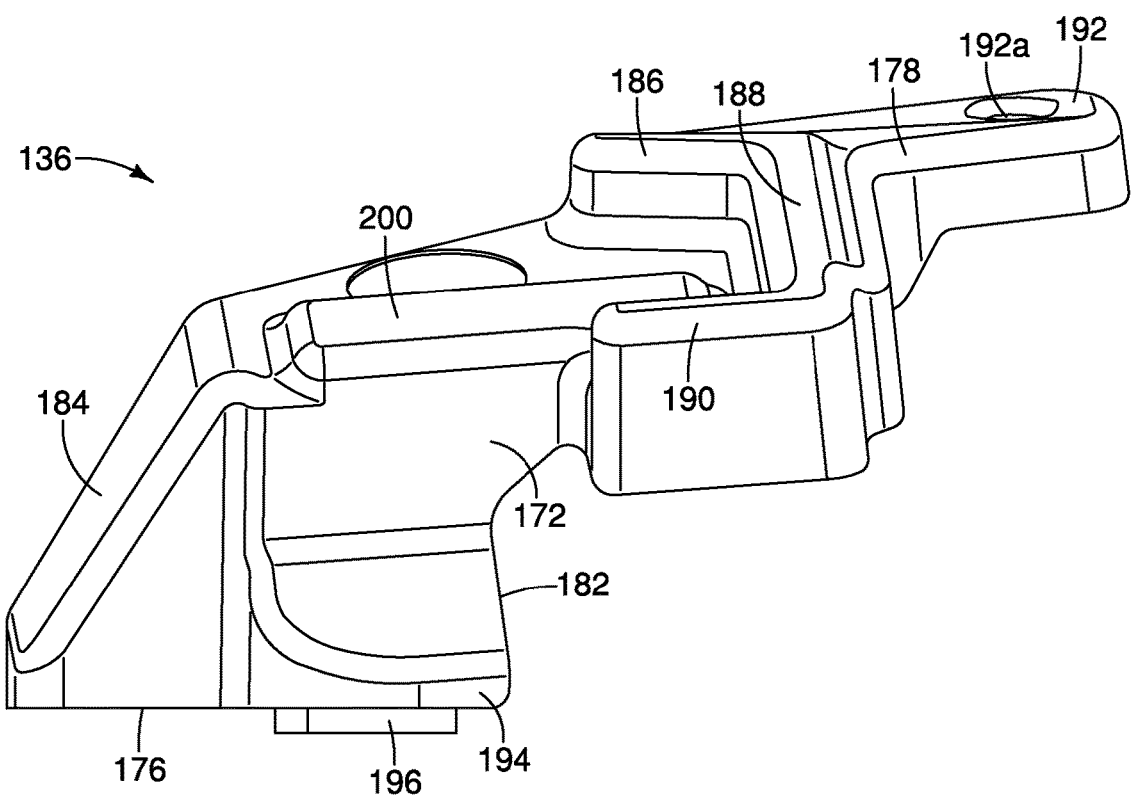
FIG. 22 is a top view (looking downward) of the of the vibration absorbing member showing the main body and the main projection along with the first, second and third portions of the U-shaped protrusion and the attachment portion in accordance with the second embodiment.
Figure 23:
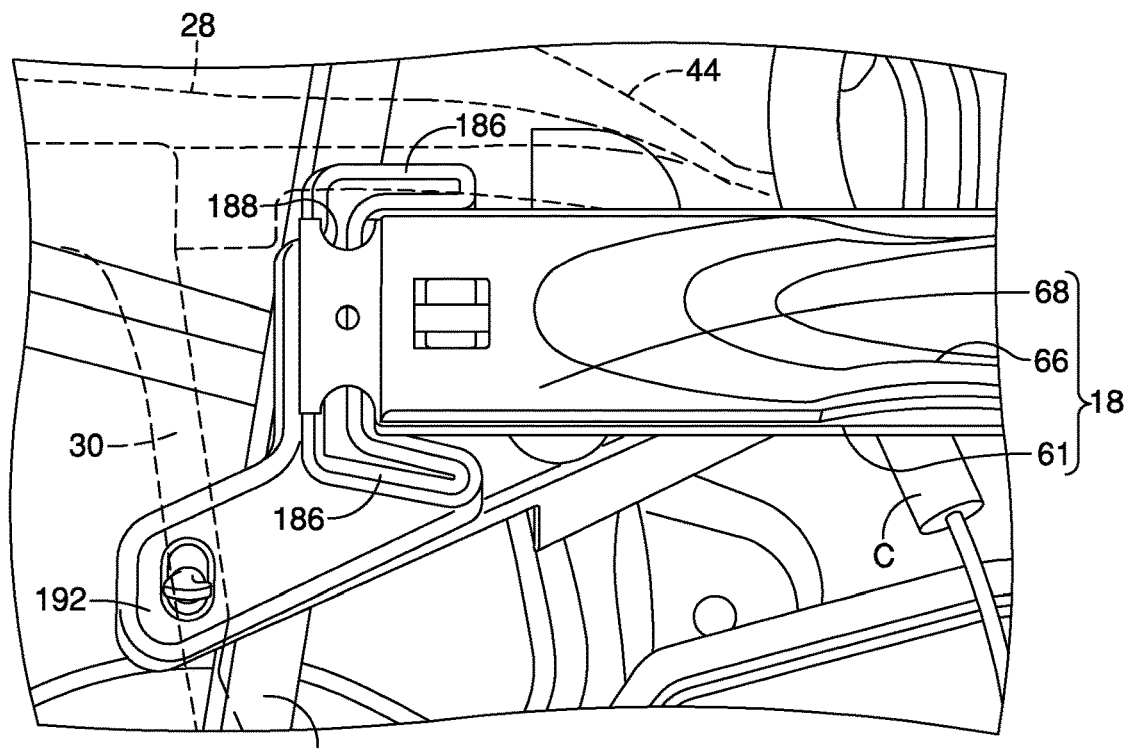
FIG. 23 is a side view of the rear door showing details of the vibration absorbing member installed within the cavity and further showing the first, second and third portions of the U-shaped protrusion confining the door handle assembly and limiting movement thereof in accordance with the second embodiment.
Figure 24:
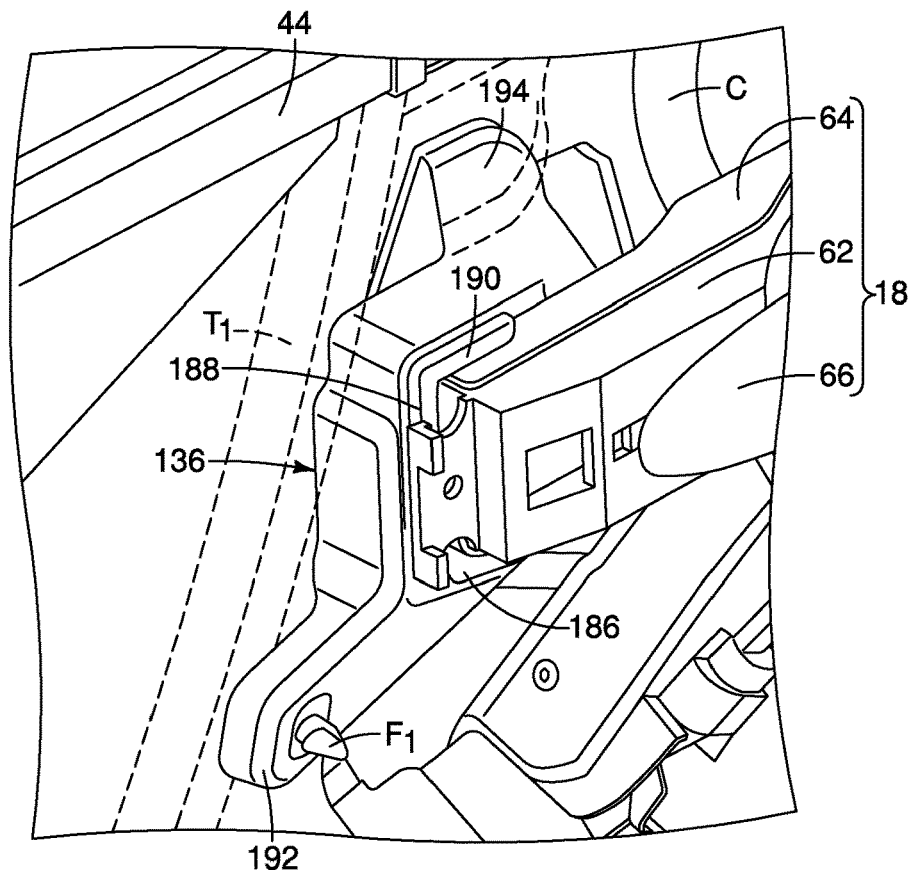
FIG. 24 is a forward perspective view of the rear door (looking in a rearward direction) with the outer panel removed showing positioning relationship between the vibration absorbing member and the window track, and the positioning relationship between the rearward projection and the main reinforcement beam in accordance with the second embodiment.

The second portion 188 is positioned such that with the rear door 16 fully assembled, the second portion 188 extends along a forward edge of the metallic reinforcement bracket 64 and under a forward portion of the handle base bracket 62 of the door handle assembly 18, as shown in FIGS. 16, 23 and 24.

The third portion 190 is positioned such that with the rear door 16 fully assembled, the third portion 190 extends above a forward area of the handle base bracket 62 and the metallic reinforcement bracket 64 of the door handle assembly 18, as shown in FIGS. 16, 23-24 and 26.

Figure 26:
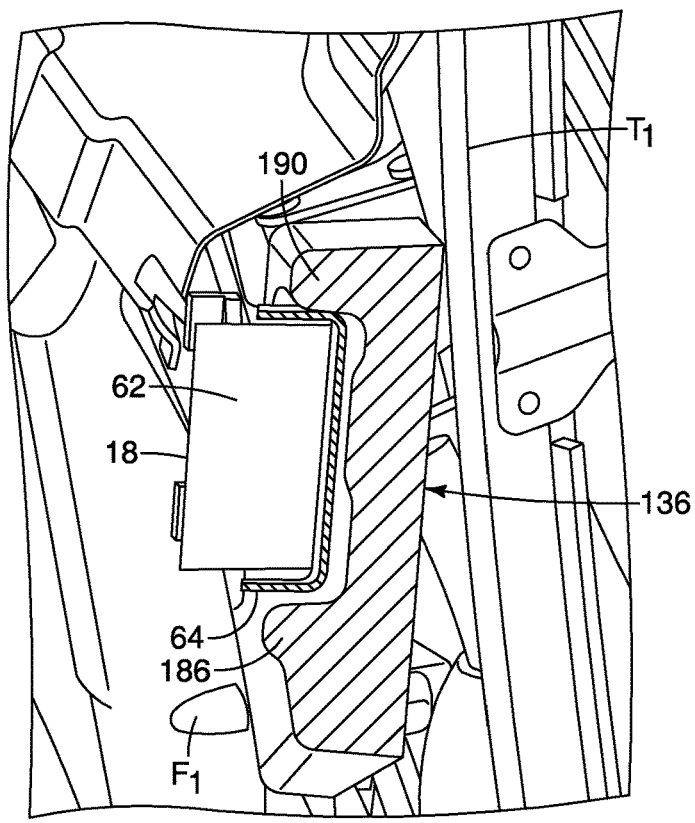
FIG. 26 is a cross-sectional view of a forward portion of the door handle assembly and the main projection of the vibration absorbing member in accordance with the second embodiment.

A lower forward end of main projection 178 includes an attachment portion 192 with an opening 192*a*. As shown in FIGS. 16, 23, and 26, the fastener Fi is inserted into the opening 192*a* and into a corresponding opening (not shown) in the first reinforcement beam 30, fixing the vibration absorbing member 136 to the first reinforcement beam 30.

Figure 25:
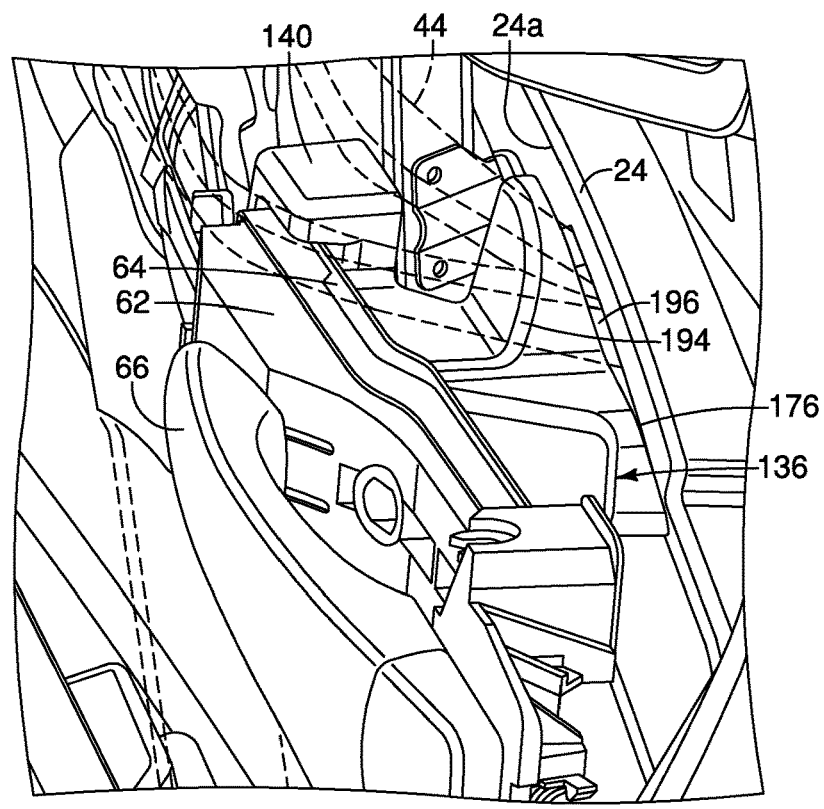
FIG. 25 is a rearward perspective view of the rear door (looking in a forward direction) with the outer panel removed showing positioning relationship between the vibration absorbing member and the inner door panel, and the positioning relationship between the rearward projection and the main reinforcement beam in accordance with the second embodiment.

The main body 172 includes a rearward projection 194 that extends upward from the rearward section 184, as shown in FIGS. 16, 23, 24 and 26. The inboard surface 176 extends along the rearward projection 194. The inboard surface 176 is positioned and oriented to extend to and/or toward an outboard surface 24*a* of the inner door panel 24, as shown in FIGS. 24 and 25. The inboard surface 176 includes a flexible and compressible pad 196 that is fixed thereto, as shown in FIGS. 19-20, 22 and 25. The pad 196 can be a thick double-sided tape or other self-adhering material with compressibility and resilience.

The rearward projection 194 further extends upward such that it extends inboard of second end 44 of the main reinforcement beam 28, as shown in FIGS. 16, 23 and 25.

With the vibration absorbing member 136 installed within the rear door 116, the main projection 178 (the forward section) of the main body 172 extends in the vehicle longitudinal direction $D_L$ outboard of the window track $T_1$ and from a location rearward of the window track $T_1$ to the first reinforcing bracket 30. The main projection 178 (the forward section) of the main body 172 has a non-contacting relationship with the window track $T_1$ with the outer door panel 26 and inner door panel 24 in a non-deformed state.

Further, the main projection 178 of the vibration absorbing member 136 is located inboard of a mid-section of first reinforcement beam 30.

The vibration absorbing member 136 is formed as a single monolithic unitary element from a polymer-based foam material. For example, the vibration absorbing member 36 can be made of a foam material that is selected for characteristics that absorb energy during an impact event and dampen vibrations. One such foam material is polypropylene that is injection molded such that during the molding process the polypropylene expands up to five times its original unexpanded volume.

The flexible and compressible pad 196 that is attached to the vibration absorbing member 136 for contact with the outboard surface 24*a* of the inner door panel 24 can be made of any of a variety of a variety of flexible and compressible materials. One example of such a flexible and compressible material is ethylene propylene diene monomer (EPDM), although any material with similar flexible and compressible properties can be employed for the flexible and compressible pad 196.

The vibration absorbing member 136 generally provides the same or similar benefits, features, functions and responses to an impact event as the vibration absorbing member 36 of the first embodiment.

The various vehicle devices and structures other than the vibration absorbing member 136 are conventional components that are well known in the art. Since these vehicle devices and structures are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
    an outer door panel having an inboard surface and an outboard surface;
    an inner door panel having an outer periphery fixed to a corresponding outer periphery of the outer door panel such that the outer and inner door panels define a cavity therebetween;
    a door handle assembly fixedly attached the outer door panel with at least a portion of the door handle assembly overlaying the inboard surface of the outer door panel within the cavity;
    a main reinforcing bracket extending from a forward end of the inner door panel to a rearward end of the inner door panel along a lower end of a window opening;
    a first reinforcing bracket having an upper end fixedly attached to the main reinforcing bracket and to a rearward area of the inner door panel within the cavity below the door handle assembly; and
    a vibration absorbing member having a main body having an outboard surface, an inboard surface and a main projection that extends forward from the main body, the main projection being fixed to the first reinforcing bracket such that the main body is rearward of the first reinforcing bracket and the outboard surface is shaped and dimensioned to correspond to the shape of the inboard portion of the door handle assembly.

2. The vehicle door assembly according to claim 1, wherein
    the outboard surface of the vibration absorbing member includes at least two projections and a surface portion therebetween dimensioned and shaped to receive the inboard portion of the door handle assembly.

3. The vehicle door assembly according to claim 2, wherein
    the inboard portion of the door handle assembly is disposed between the at least two projections along the surface portion of the outboard surface of the vibration absorbing member in the absence of any mechanical attachment therebetween.

4. The vehicle door assembly according to claim 1, wherein
    the main body defines a forward section and a rearward section with the main projection defining the forward section, the rearward section having a thickness measured in a vehicle lateral direction that is greater than a thickness of the forward section.

5. The vehicle door assembly according to claim 4, further comprising:
    a window regulator assembly installed within the cavity and having window tracks, with the rearward section of the main body contacting an outboard surface of the inner door panel at a location rearward and inboard relative to an adjacent one of the window tracks, and the forward section of the main body being located outboard of the adjacent one of the window tracks.

6. The vehicle door assembly according to claim 5, wherein
    the forward section of the main body extends in a vehicle longitudinal direction outboard of the adjacent one of the window tracks from a location rearward of the adjacent one of the window tracks to the first reinforcing bracket, the forward section of the main body having a non-contacting relationship with the adjacent one of the window tracks with the outer door panel and inner door panel in a non-deformed state.

7. The vehicle door assembly according to claim 4, wherein
    the rearward section of main body of the vibration absorbing member includes an upward projection that extends upward from the inboard section of the main body such that the upward projection extends to an area inboard of an adjacent section of the main reinforcing bracket.

8. The vehicle door assembly according to claim 1, wherein
    the vibration absorbing member is formed as a single monolithic unitary element.

9. The vehicle door assembly according to claim 8, wherein
    the vibration absorbing member is formed from a polymer-based foam material.

10. A vehicle door assembly, comprising:
    an outer door panel having an inboard surface and an outboard surface;
    an inner door panel having an outer periphery fixed to a corresponding outer periphery of the outer door panel defining a cavity therebetween;
    a door handle assembly fixedly attached the outer door panel with at least an inboard portion of the door handle assembly overlaying the inboard surface of the outer door panel within the cavity;
    a main reinforcing bracket extending from a forward end of the inner door panel to a rearward end of the inner door panel along a lower end of a window opening;
    a window regulator assembly installed within the cavity and having window tracks;
    a first reinforcing bracket having an upper end fixedly attached to the main reinforcing bracket and to a rearward area of the inner door panel within the cavity below the door handle assembly; and
    a vibration absorbing member having a main body having an outboard surface, an inboard surface, a main projection that extends forward from the main body, and a upward projection that extends upward from the main body, such that the main projection is fixed to the first reinforcing bracket at a location forward of an adjacent one of the window tracks, and, the upward projection is located rearward and inboard of the adjacent one of the window tracks and extends upward from the main body to an area inboard of an adjacent section of the main reinforcing bracket.

11. The vehicle door assembly according to claim 10, wherein
    the outboard surface of the vibration absorbing member is shaped and dimensioned to correspond to the shape of the inboard portion of the door handle assembly.

12. The vehicle door assembly according to claim 11, wherein
the outboard surface of the vibration absorbing member includes at least two projections and a surface portion therebetween dimensioned and shaped to receive the inboard portion of the door handle assembly.

13. The vehicle door assembly according to claim 12, wherein
the inboard portion of the door handle assembly is disposed between the at least two of projections along the surface portion of the outboard surface of the vibration absorbing member in the absence of any mechanical attachment therebetween.

14. The vehicle door assembly according to claim 10, wherein
the main body defines a forward section and a rearward section with the main projection extending forward from the main body, and the upward projection extends upward from the rearward section, the rearward section having a thickness measured in a vehicle lateral direction that is greater than a thickness of the forward section.

15. The vehicle door assembly according to claim 14, wherein
the inboard section of the main body contacts an outboard surface of the inner door panel at a location rearward and inboard relative to an adjacent one of the window tracks.

16. The vehicle door assembly according to claim 14, wherein
the forward section of the main body has a non-contacting relationship with the adjacent one of the window tracks with the outer door panel and inner door panel in a non-deformed state.

17. The vehicle door assembly according to claim 14, wherein
the vibration absorbing member is formed as a single monolithic unitary element.

18. The vehicle door assembly according to claim 17, wherein
the vibration absorbing member is formed from a polymer-based foam material.

* * * * *